United States Patent
Byun et al.

(10) Patent No.: US 10,757,541 B2
(45) Date of Patent: Aug. 25, 2020

(54) METHOD AND APPARATUS FOR CONTROLLING SESSION

(71) Applicant: LG ELECTRONICS INC., Seoul (KR)

(72) Inventors: Daewook Byun, Seoul (KR); Jian Xu, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/772,019

(22) PCT Filed: Oct. 26, 2016

(86) PCT No.: PCT/KR2016/012036
§ 371 (c)(1),
(2) Date: Apr. 27, 2018

(87) PCT Pub. No.: WO2017/073992
PCT Pub. Date: May 4, 2017

(65) Prior Publication Data
US 2018/0324559 A1   Nov. 8, 2018

Related U.S. Application Data

(60) Provisional application No. 62/248,307, filed on Oct. 30, 2015.

(51) Int. Cl.
*H04W 4/00* (2018.01)
*H04W 4/06* (2009.01)
(Continued)

(52) U.S. Cl.
CPC ............... *H04W 4/06* (2013.01); *H04L 63/00* (2013.01); *H04W 4/44* (2018.02); *H04W 80/10* (2013.01); *H04L 12/189* (2013.01); *H04W 4/021* (2013.01)

(58) Field of Classification Search
CPC ... H04L 5/0001; H04L 5/0053; H04L 12/189; H04L 29/08; H04W 4/021; H04W 4/06;
(Continued)

(56) References Cited

U.S. PATENT DOCUMENTS

| 10,080,124 B2* | 9/2018 | Tan ........................ H04W 4/80 |
| 2014/0177506 A1* | 6/2014 | Korus ..................... H04W 4/06 |
| | | 370/312 |

(Continued)

FOREIGN PATENT DOCUMENTS

| WO | 2014099292 | 6/2014 |
| WO | 2014153705 | 10/2014 |
| WO | 2015043813 | 4/2015 |

OTHER PUBLICATIONS

ITU-R, Audio-visual capabilities and applications supported by terrestrial IMT systems, Report ITU-R M.2373-0, 40 pages, Jul. 2015.*

(Continued)

*Primary Examiner* — Frank Duong
(74) *Attorney, Agent, or Firm* — Lee Hong Degerman Kang Waimey

(57) ABSTRACT

Provided are a method for controlling, by a multi-cell coordination entity (MCE), a session for transmitting a V2X message in a wireless communication system, and an apparatus for supporting the same. The method comprises the steps of: receiving, by the MCE, a cell ID and a multimedia broadcast multicast service (MBMS) service area identity (SAI) from a mobility management entity (MME); determining a multicast broadcast single frequency network (MBSFN) area to which the V2X message is to be transferred on the basis of the cell ID; transmitting a session control message to a base station which belongs to the (Continued)

determined MBSFN area, wherein the cell ID may be an ID of a cell to which the V2X message is transmitted.

13 Claims, 17 Drawing Sheets

(51) Int. Cl.
*H04W 80/10* (2009.01)
*H04L 29/06* (2006.01)
*H04W 4/44* (2018.01)
*H04W 4/021* (2018.01)
*H04L 12/18* (2006.01)

(58) Field of Classification Search
CPC ..... H04W 4/44; H04W 4/40; H04W 72/0486; H04W 72/12; H04W 72/1252; H04W 80/10; H04W 92/16
See application file for complete search history.

(56) References Cited

U.S. PATENT DOCUMENTS

2016/0013977 A1* 1/2016 Hu ................... H04W 72/005 370/329
2016/0080163 A1* 3/2016 Taylor ................... H04L 12/189 370/312
2018/0262887 A1* 9/2018 Futaki ................... H04W 48/20

OTHER PUBLICATIONS

3GPP TR 22.885, 3rd Generation Partnership Project; Technical Specification Group Services and System Aspects; Study on LTE Support for V2X Services (Release 14), V0.2.0, 33 pages, Apr. 2015.*

Araniti et al, LTE for Vehicular Networking: A Survey, IEEE, 10 pages, May 2013.*

PCT International Application No. PCT/KR2016/012036, Written Opinion of the International Searching Authority dated Jan. 23, 2017, 50 pages.

Nokia Networks, "New WID on Study on MBMS Enhancements," 3GPP TSG SA #66, TD SP-140883, Dec. 2014, 7 pages.

Nguyen et al., "Service continuity for eMBMS in LTE/LTE-Advanced network: Standard analysis and supplement," 2014 IEEE 11th Consumer Communications and Networking Conference (CCNC), Jan. 2014, 8 pages.

* cited by examiner (a)

(b)

METHOD AND APPARATUS FOR CONTROLLING SESSION

CROSS-REFERENCE TO RELATED APPLICATIONS

This application is the National Stage filing under 35 U.S.C. 371 of International Application No. PCT/KR2016/012036, filed on Oct. 26, 2016, which claims the benefit of U.S. Provisional Application No. 62/248,307, filed on Oct. 30, 2015, the contents of which are all hereby incorporated by reference herein in their entirety.

BACKGROUND OF THE INVENTION

Field of the Invention

The present invention relates to a wireless communication system, and more particularly, to a method of controlling a session for transmitting a V2X message on the basis of an MBMS system, and an apparatus supporting the method.

Related Art

3rd Generation Partnership Project (3GPP) Long Term Evolution (LTE) that is an advancement of Universal Mobile Telecommunication System (UMTS) is being introduced with 3GPP release 8. In 3GPP LTE, orthogonal frequency division multiple access (OFDMA) is used for downlink, and single carrier-frequency division multiple access (SC-FDMA) is used for uplink. The 3GPP LTE adopts multiple input multiple output (MIMO) having maximum four antennas. Recently, a discussion of 3GPP LTE-Advanced (LTE-A) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE_LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain is not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D communication.

D2D communication may have various advantages in that it is communication between devices in proximity. For example, D2D UE has a high transfer rate and a low delay and may perform data communication. Furthermore, in D2D communication, traffic concentrated on a base station can be distributed. If D2D UE plays the role of a relay, it may also play the role of extending coverage of a base station.

SUMMARY OF THE INVENTION

When a V2X message is transmitted based on the existing MBMS system, it may be difficult to transfer the V2X message only for a specific area. For example, when the V2X message is transferred by using the existing MBMS system, it may be impossible to transfer the V2X message only to a specific neighbor base station. Therefore, there is a need to newly propose a method for limiting an area where the V2X message is transferred and an apparatus for supporting the method.

According to an embodiment, there is provided a method of controlling a session for transmitting a V2X message by a multi-cell coordination entity (MCE) in a wireless communication system. The MCE may receive a cell ID and a multimedia broadcast multicast service (MBMS) service area identity (SAI) from a mobility management entity (MME), determine a multicast broadcast single frequency network (MBSFN) area where the V2X message is to be transferred on the basis of the cell ID, and transmit a session control message to a base station which belongs to the determined MBSFN area. The cell ID may be an ID of a cell in which the V2X message is transmitted.

The MBMS SAI may be set to 0.

The session control message may be an MBMS session start request message. The cell ID and the MBMS SAI may be included in the MBMS session start request message transmitted by the MME.

The session control message may be an MBMS session update request message. The cell ID and the MBMS SAI may be included in the MBMS session update request message transmitted by the MME.

The base station may be a road side unit (RSU).

According to another embodiment, there is provided a method of controlling a session for transmitting a V2X message by an MCE in a wireless communication system. The MCE may a session control message including a cell list and a source cell indication from an MME, filter the session control message on the basis of the cell list and the source cell indication, and transmit the filtered session control message to a base station. The source cell indication may indicate a cell in which the V2X message is transmitted.

The filtered session control message may include a list of cells managed by the base station.

The base station may be a base station which manages a cell indicated by the source cell indication.

The base station may be a base station which manages a neighbor cell of a cell indicated by the source cell indication.

The session control message may be any one of an MBMS session start request message and an MBMS session update request message.

The base station may be an RSU.

According to another embodiment, there is provided an MCE for controlling a session for transmitting a V2X message in a wireless communication system. The MCE may include: a memory; a transceiver; and a processor for coupling the memory and the transceiver. The processor may be configured to: control the transceiver to receive a cell ID and an MBMS SAI from an MME; determine an MBSFN area where the V2X message is to be transferred on the basis of the cell ID; and control the transceiver to transmit a session control message to a base station which belongs to the determined MBSFN area. The cell ID may be an ID of a cell in which the V2X message is transmitted.

The MBMS SAI may be set to 0.

An area where a V2X message is transmitted can be limited.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
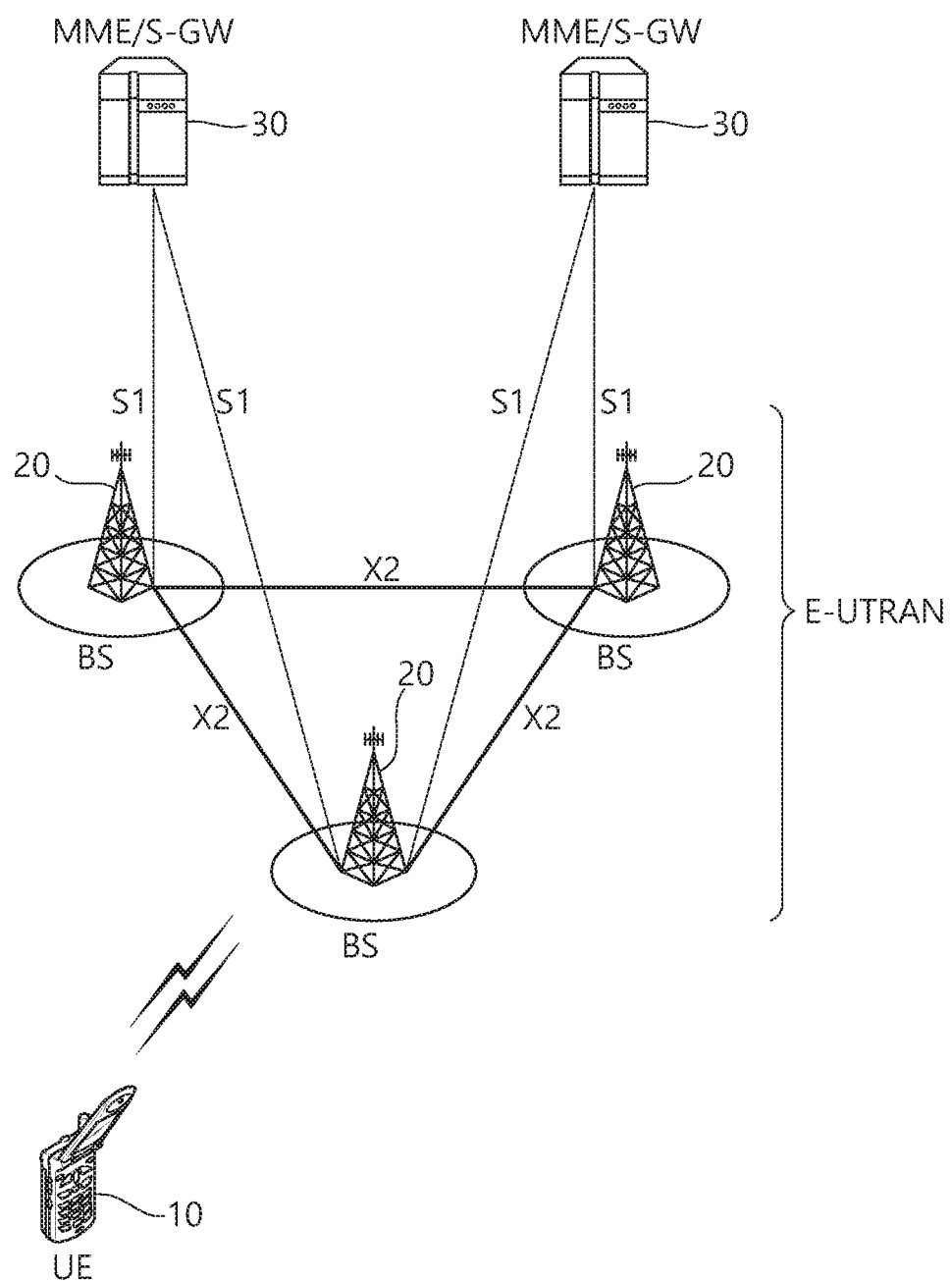
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
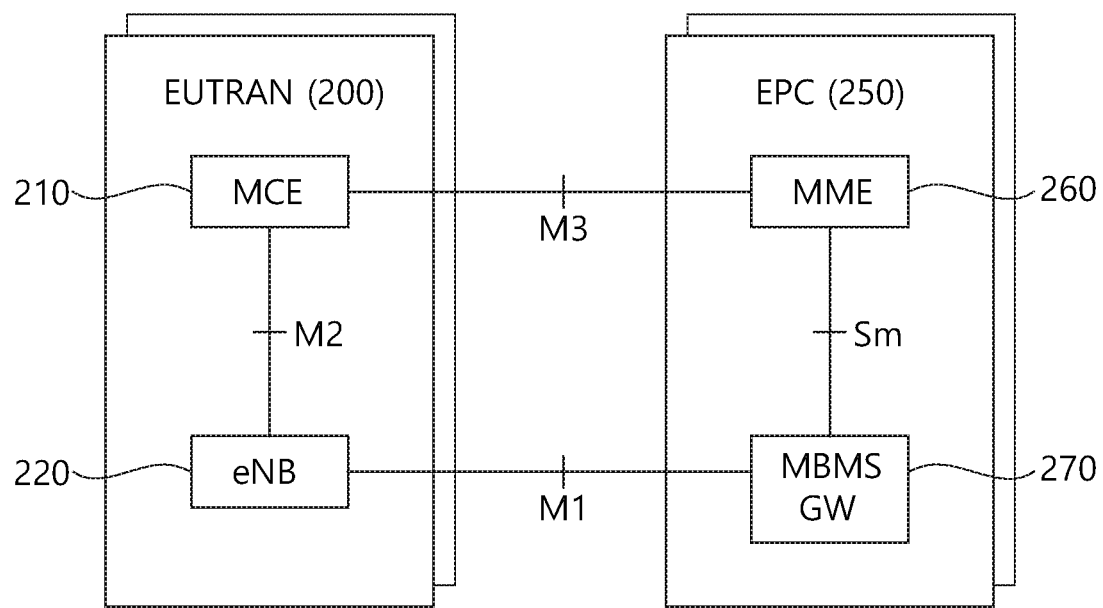
FIG. 2 shows a network architecture for an MBMS.

FIG. 2 shows a network architecture for a Multimedia Broadcast/Multicast Service (MBMS).

Referring to FIG. 2, the radio access network (EUTRAN) 200 includes a multi-cell coordination entity (hereinafter, "MCE") 210 and a base station (eNB) 220. The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The Evolved Packet Core (EPC) 250 includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

Figure 3:
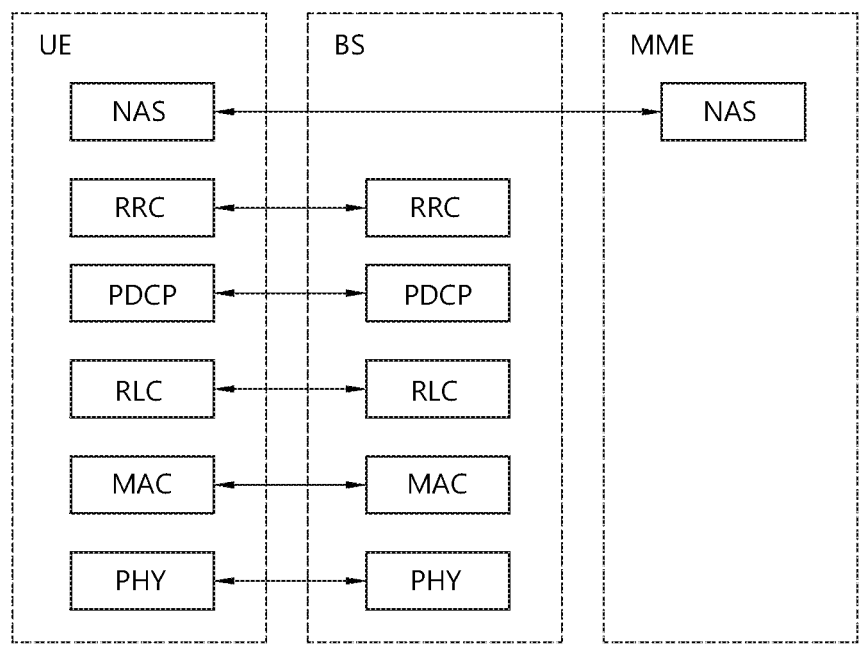
FIG. 3 shows a control plane and a user plane of a radio interface protocol of an LTE system.
Figure 3:
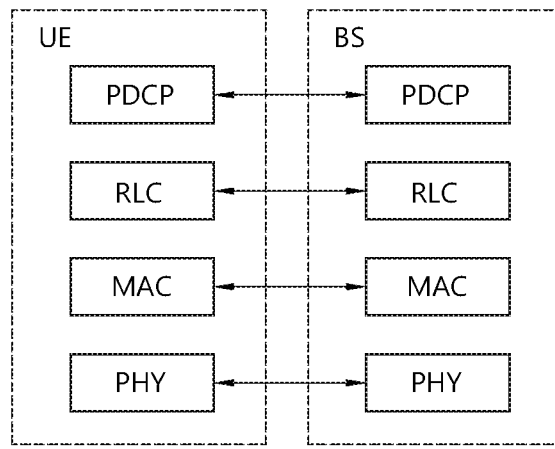

FIG. 3 shows a control plane and a user plane of a radio interface protocol of an LTE system. FIG. 3(*a*) shows a control plane of a radio interface protocol of an LTE system. FIG. 3(*b*) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, an MBMS and a Multicast/Broadcast Single Frequency Network (MBSFN) are Described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns the highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned the highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

Figure 4:
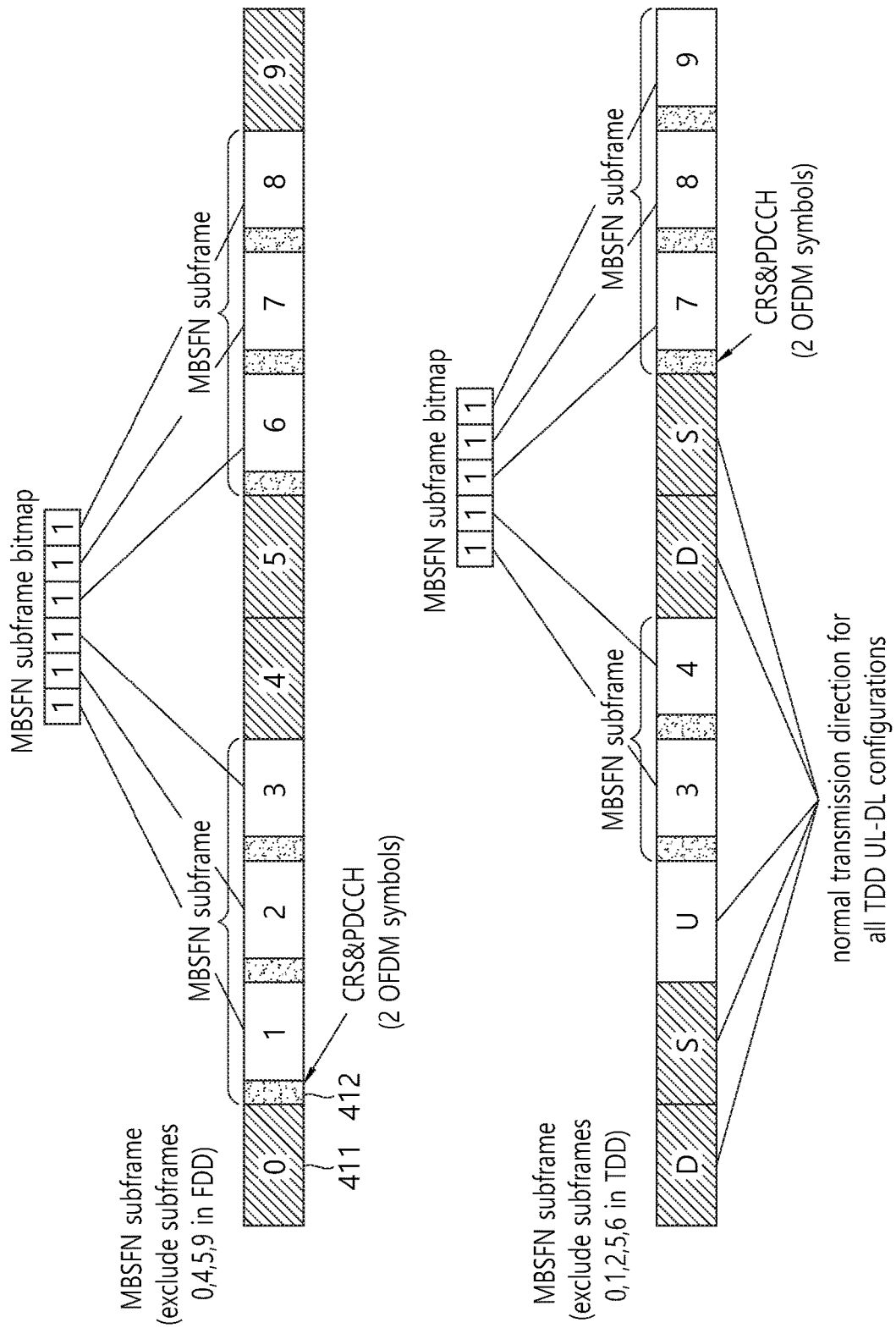
FIG. 4 shows a structure of an MBSFN subframe.

FIG. 4 shows a structure of an MBSFN subframe.

Referring to FIG. 4, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe. Since most UEs perform radio resource management (RRM), radio link failure (RLF) processing, and synchronization using a CRS, it is important to indicate the absence of a CRS in a specific region. A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 411 uses a normal CP, a CRS according to the normal CP is also used in the first two OFDM symbols 412 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Figure 5:
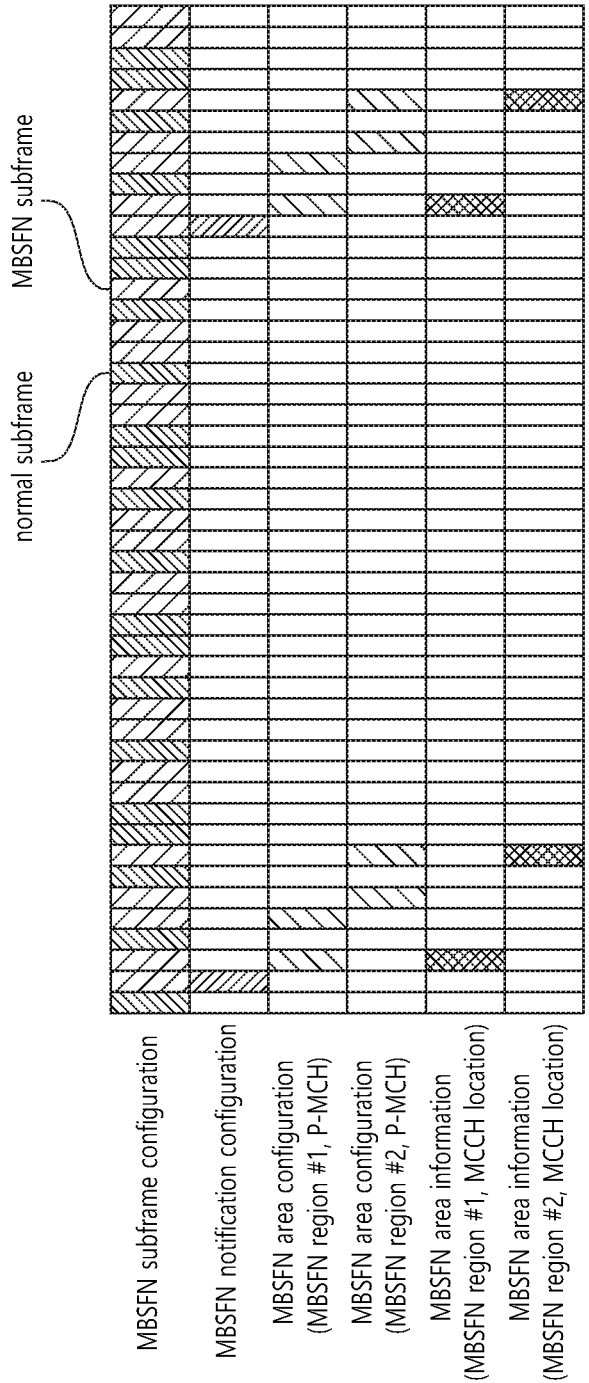
FIG. 5 shows an example of an MBSFN subframe configuration for performing an MBMS service.

FIG. 5 shows an example of an MBSFN subframe configuration for performing an MBMS service.

Referring to FIG. 5, a UE acquires MBSFN subframe configuration information, MBSFN notification configuration information, and MBSFN area information list to perform the MBMS service.

The UE may know the MBSFN subframe configuration information, that is, a position of an MBSFN subframe, through SIB2 and RRC dedicated signaling. For example, the MBSFN subframe configuration information may be included in an MBSFN-SubframeConfig information element (IE).

In addition, the UE may acquire the MBSFN area information list and the MBMS notification configuration information as information required to acquire MBMS control information related to one or more MBSFN regions in which the MBMS service can be performed through SIB13. Herein, for each MBSFN region, the MBSFN area information list may include an MBSFN region ID, information regarding an MBSFN region in an MBSFN subframe in a corresponding MBSFN region, information such as an MBSFN subframe position at which transmission of an MCCH occurs as an MBMS control information channel, or the like. For example, the MBSFN area information list may be included in an MBSFN-AreaInfoList information element. Meanwhile, the MBSFN notification configuration information is configuration information for a subframe position at which an MBMS notification occurs to inform that there is a change in the MBSFN region configuration information. For example, the MBSFN notification configuration information may be included in an MBMS-NotificationConfig information element. The MBSFN notification configuration information includes time information utilized to notify an MCCH change applicable to all MBSFN regions. For example, the time information may include a notification repetition coefficient (notificationRepetitionCoeff), a notification offset (notificationOffset), and a notification subframe index (notificationSF-Index). Herein, the notification repetition coefficient implies a common notification repetition period for all MCCHs. The notification offset indicates an offset of a radio frame in which the MCCH change notification information is scheduled. In addition, the notification subframe index is a subframe index used to transmit an MCCH change notification on a PDCCH.

The UE may acquire the MBSFN region configuration information through an MCCH corresponding to each of the MBSFN regions acquired through SIB13. The MBSFN region configuration information may be included in an MBSFNAreaconfiguration message, and contains information regarding physical multicast channels (PMCHs) used in a corresponding MBSFN region. For example, information regarding each PMCH may include a position of an MBSFN subframe in which a corresponding PMCH is located, modulation and coding scheme (MCS) level information used for data transmission in a corresponding subframe, MBMS service information transmitted by the corresponding PMCH, or the like.

The UE receives MCH data through the MTCH on the basis of the PMCH. Scheduling on a time for the MCH data may be known through MCH scheduling information (MSI) delivered through the PMCH. The MSI contains information regarding how long corresponding MCH data transmission is continued.

Hereinafter, Single-Cell Point-to-Multipoint (SCPTM) Transmission is Described.

A transmission method of an MBMS service includes SCPTM transmission and multimedia broadcast multicast service single frequency network (MBSFN) transmission. While identifiable signals are transmitted simultaneously in a plurality of cells in the MBSFN transmission, the MBMS service is transmitted in a single cell in the SCPTM transmission. Therefore, unlike in the MBSFN transmission, synchronization between cells is not necessary in the SCPTM transmission. Further, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is determined that a service desired by the UE is an SCPTM service through the MCCH, the UE may acquire a corresponding RNTI value and read a PDCCH through a corresponding RNTI to receive the SCPTM service.

Hereinafter, V2X Will be Described.

V2X communication implies a communication scheme which exchanges or shares information such as a traffic condition or the like while communicating with a road infrastructure and other vehicles during driving. V2X may include a vehicle to vehicle (V2V) which means communication between vehicles, a vehicle to pedestrian (V2P) which means communication between a vehicle and a UE carried by an individual, and a vehicle to infrastructure (V2I)/network (N) which means communication between a vehicle and a roadside unit (RSU)/network. In this case, the RSU may be a transportation infrastructure entity implemented by an eNB (or eNodeB-type RSU) or a stationary UE (or UE-type RSU).

Figure 6:
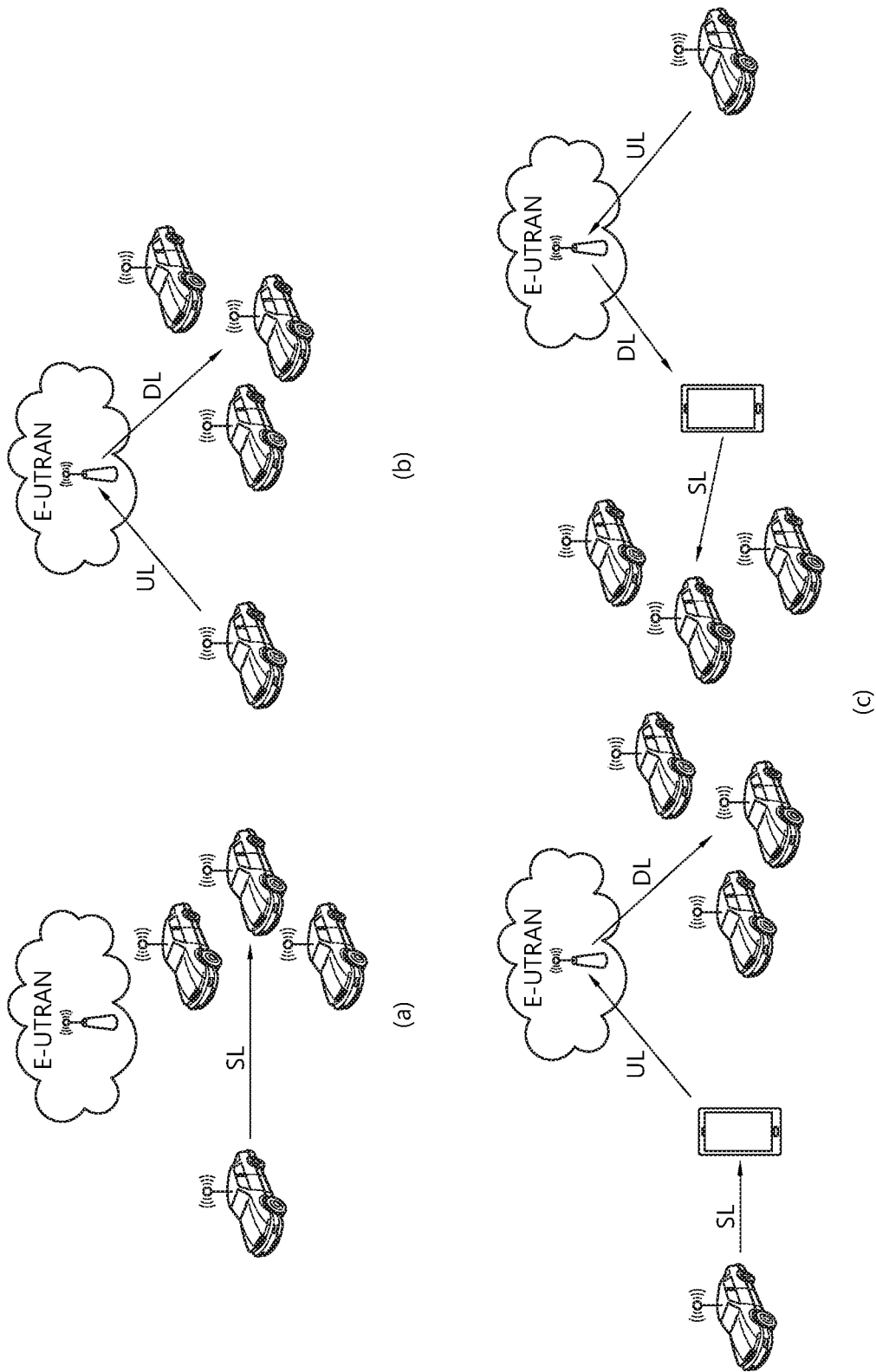
FIG. 6 shows a scenario considered for V2X.

FIG. 6 shows a scenario considered for V2X.

Referring to FIG. 6(a), a scenario supporting only a V2V operation based on only PC5 which is an interface between UEs may be considered for V2X. Referring to FIG. 6(b), a scenario supporting only a V2V operation based on only Uu which is an interface between an eNB and a UE may be considered for V2X. Referring to FIG. 6(c), a scenario supporting a V2V operation based on both PC5 and Uu may be considered for V2X.

Figure 7:
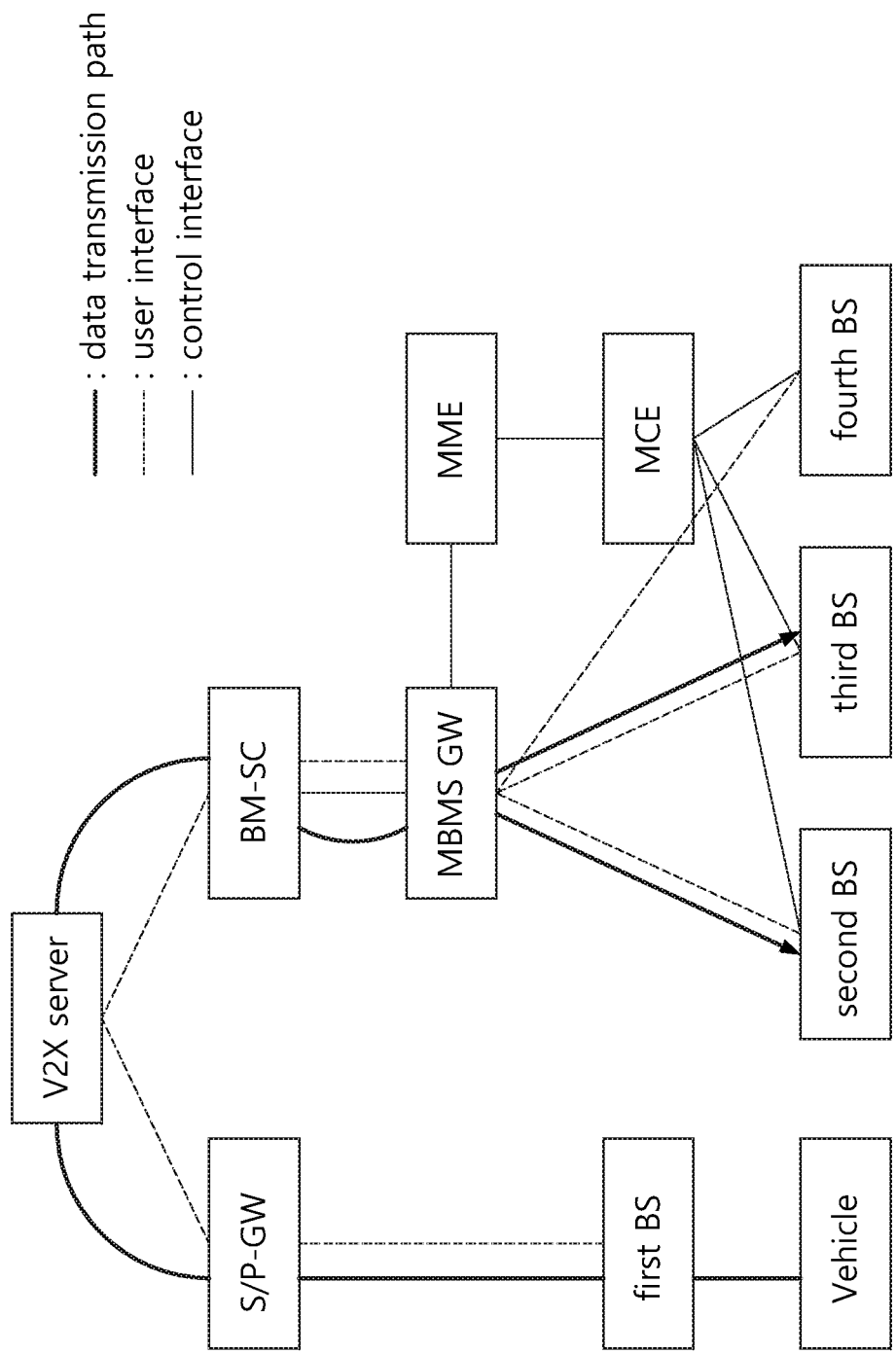
FIG. 7 shows a method of transmitting a V2X message by using an MBMS system.

FIG. 7 shows a method of transmitting a V2X message by using an MBMS system.

Referring to FIG. 7, in order to transfer the V2X message to an area of more than one eNB and/or more than one RSU, the existing MBMS system may be considered. It is assumed that an eNB2 and an eNB3 are neighbors of the eNB1. On the other hand, it is assumed that an eNB4 is not a neighbor of the eNB1. When a vehicle transmits a V2X related message via a Uu interface to the eNB1, this message should be provided not to the eNB4 but to the eNB2 and the eNB3. However, when the V2X message is transmitted based on the current MBMS system, the V2X message transmitted from the eNB1 cannot be transferred only to the eNB2 and the eNB3 by excluding the eNB4. Therefore, there is a need to propose a procedure for transferring the V2X message only in a narrow area with respect to an eNB which receives the V2X message.

Hereinafter, a method of transmitting a V2X message is described according to an embodiment of the present invention.

In the present specification, an eNB may be a concept that includes not only a typical eNB but also an RSU. The RSU may be an eNB-type RSU or a UE-type RSU.

Figure 8:
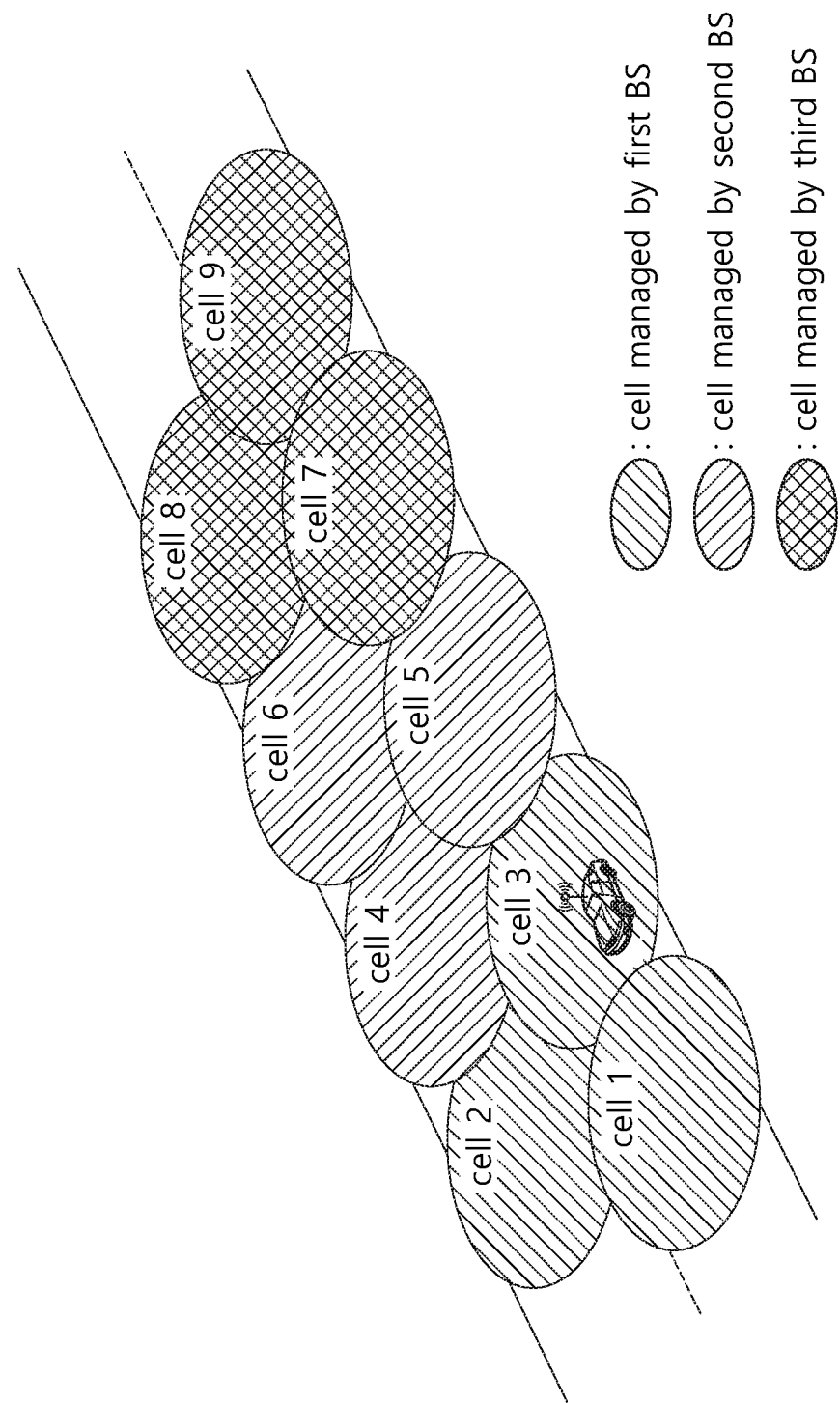
FIG. 8 is a drawing for explaining a procedure of transmitting a V2X message according to an embodiment of the present invention.

FIG. 8 is a drawing for explaining a procedure of transmitting a V2X message according to an embodiment of the present invention.

Referring to FIG. 8, it is assumed that an eNB1 manages cells 1, 2, and 3, an eNB2 manages cells 4, 5, and 6, and an eNB3 manages cells 7, 8, and 9. It is assumed that the eNBs 1, 2, and 3 are connected with the same MCE via an M2 interface. It is assumed that the MCE is connected with an MME via an M3 interface. It is assumed that an accident such as a vehicle collision occurs in an area of the cell 3.

Hereinafter, a V2X message transmission method based on an SCPTM operation (first method) and a V2X message transmission method based on an MBMS operation (second method) will be described according to an embodiment of the present invention.

<First Method>

The first method is based on SCPTM operation. A V2X server may indicate a list of cells, which need to transmit the V2X message, and information related to a cell which receives the V2X message. The information related to the cell which receives the V2X message may be information related to a cell which receives the V2X message from a vehicle. Accordingly, an area where the V2X message to be broadcast can be limited.

The first method may be classified again according to whether an MCE filters the distribution of a session control message. For example, the session control message may be any one of an MBMS session start request message and an MBMS session update request message.

Figure 9A:
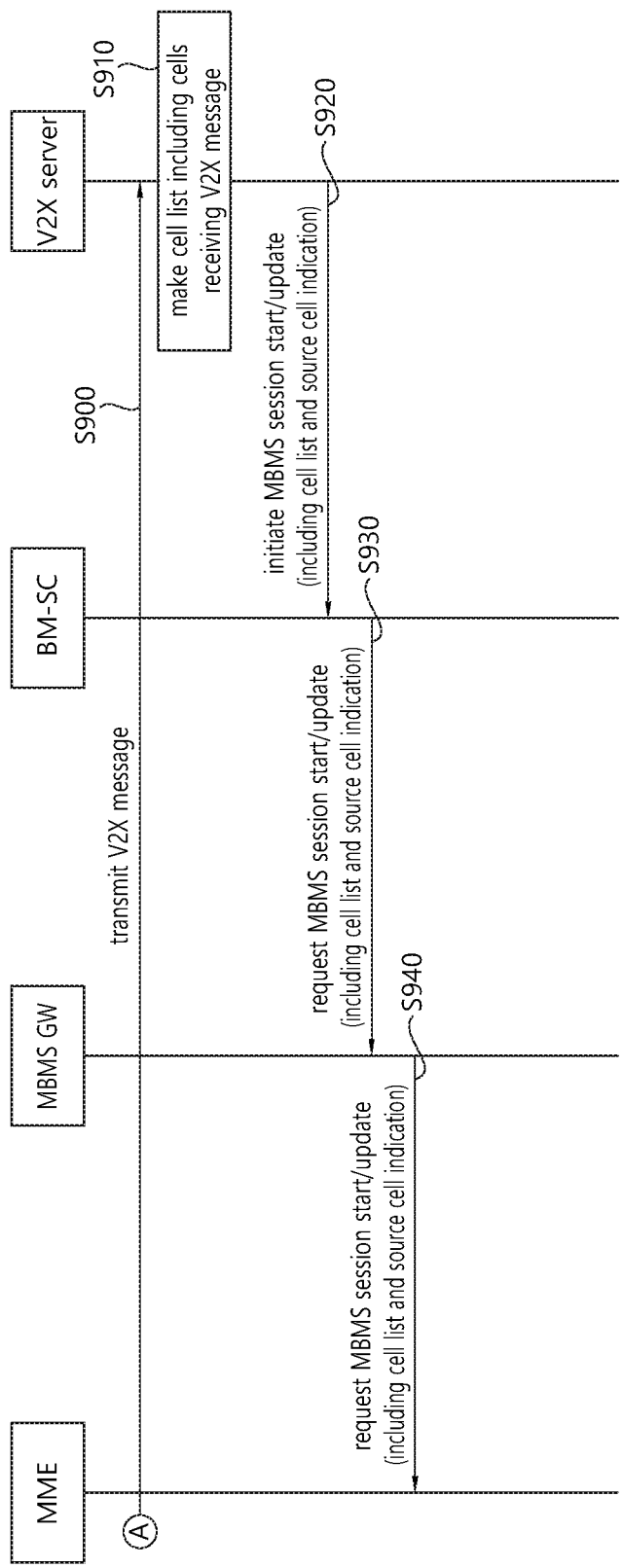
FIG. 9A and FIG. 9B show a procedure of controlling a session for transmitting a V2X message when an MCE does not filter the distribution of a session control message according to an embodiment of the present invention.
Figure 9B:
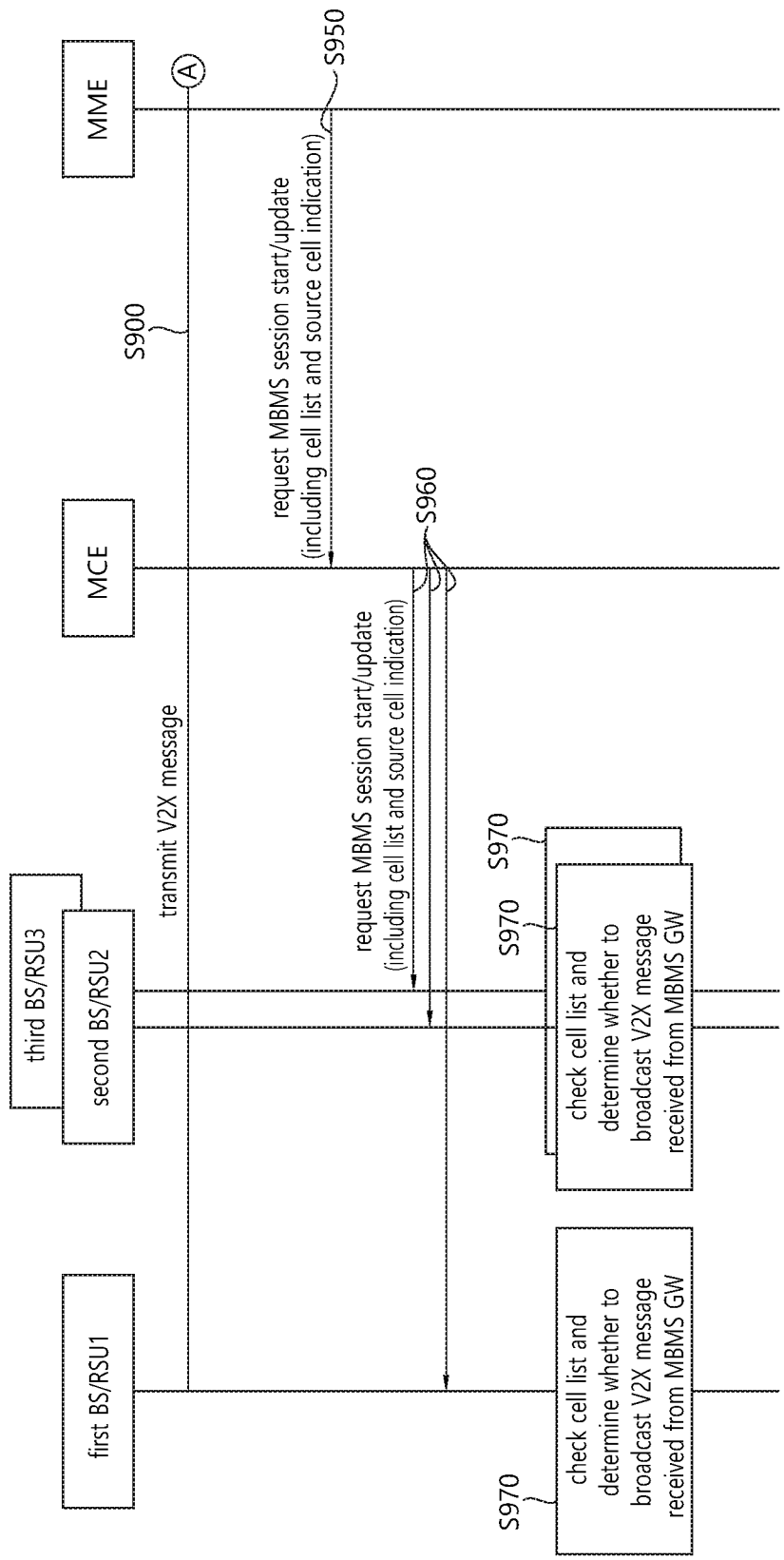

FIG. 9A and FIG. 9B show a procedure of controlling a session for transmitting a V2X message when an MCE does not filter the distribution of a session control message according to an embodiment of the present invention.

Referring to FIG. 9A, in step S900, an eNB1 may transmit to a V2X server a V2X message received from a vehicle within the coverage of the eNB1. The V2X message may contain information on an accident event. The V2X server may obtain a cell ID through the V2X message. Alternatively, the V2X server may obtain the cell ID through reporting by the vehicle. In the embodiment of FIG. 8, the eNB1 may transmit to the V2X server a V2X message received from a vehicle within the coverage of a cell 3. The V2X server may obtain a cell ID of the cell 3 through the V2X message or reporting by the vehicle.

In step S910, the V2X server may make a list of cells which need to transmit the V2X message. The cell list may include a cell which transmits the V2X message. In the embodiment of FIG. 8, the list of cells which need to transmit the V2X message may include cells 1 to 9. The list of cells which need transmit the V2X message may include a cell (i.e., the cell 3) which transmits the V2X message.

In step S920, the V2X may transmit to a BM-SC an MBMS session start initiate message, an MBMS session update initiate message, an existing message, a new IE included in the existing message, or a new IE included in the new message. The message may include a cell list and a source cell indication. The source cell indication may indicate information related to the cell which transmits the V2X message. The source cell indication may indicate whether each cell within the cell list transmits the V2X message. Alternatively, the source cell indication may be an ID of the cell which transmits the V2X message. In the embodiment of FIG. 8, the cell list may include the cells 1 to 9. The source cell indication may be an indication for the cell 3. Alternatively, the source cell indication may be an ID of the cell 3.

In step S930, upon receipt of the MBMS session start initiate message from the V2X server, the BM-SC may transmit an MBMS session start/update request message to an MBMS GW. The MBMS session start request message may include a cell list and a source cell indication. Alternatively, upon receipt of the MBMS session update initiate message from the V2X server, the BM-SC may transmit an MBMS session update request message to the MBMS GW. The MBMS session update request message may include the cell list and the source cell indication.

In step S940, the MBMS GW may transmit the MBMS session start request message to an MME. The MBMS session start request message may include the cell list and the source cell indication. Alternatively, the MBMS may transmit the MBMS session update request message to the MME. The MBMS session update request message may include the cell list and the source cell indication.

Referring to FIG. 9B, in step S950, the MME may transmit the MBMS session start request message to an MCE. The MBMS session start request message may include the cell list and the source cell indication. Alternatively, the MME may transmit the MBMS session update request message to the MCE. The MBMS session update request message may include the cell list and the source cell indication.

In step S960, upon receipt of the MBMS session start request message from the MME, the MCE may transmit the MBMS session start request message to an eNB. The MBMS session start request message may include the cell list and the source cell indication. Alternatively, upon receipt of the MBMS session update request message from the MME, the MCE may transmit the MBMS session update request message to the eNB. The MBMS session update request message may include the cell list and the source cell indication. The cell list may be identical to a cell list received from the MME. That is, the MCE may transmit the cell list received from the MME directly to the eNB. The eNB may be an eNB managed by the MCE. In the embodiment of FIG. 8, since the cell list received by the MCE from the MME includes the cells 1 to 9, the cell list transmitted by the MCE to the eNBs 1 to 3 may include the cells 1 to 9. In addition, the source cell indication may indicate the cell 3.

In step S970, upon receipt of the MBMS session start request message or the MBMS session update request message from the MCE, the eNB may check the cell list and the source cell indication.

If the cell managed by the eNB is contained in the cell list and the eNB is an eNB for managing a cell indicated by the source cell indication, the eNB may broadcast the V2X message. Alternatively, if the cell managed by the eNB is contained in the cell list and the eNB is an eNB having the cell indicated by the source cell indication as a neighbor, the eNB may broadcast the V2X message. The eNB may broadcast the V2X message only in a cell within the cell list. Alternatively, the eNB may broadcast the V2X message in all cells controlled by the eNB. In addition, the eNB may transmit an MBMS session start response message to the MCE in response to the MBMS session start request message. Alternatively, the eNB may transmit an MBMS session update response message to the MCE in response to the MBMS session update request message.

If the cell managed by the eNB is contained in the cell list but the eNB is not the eNB for managing the cell indicated by the source cell indication and the eNB is not the eNB having the cell indicated by the source cell indication as the neighbor cell, the eNB may not broadcast the V2X message.

In addition, the eNB may reject or ignore the MBMS session start request message and the MBMS session update request message.

In the embodiment of FIG. 8, the eNB1 may check the cell list including the cells 1 to 9 and the source cell indication indicating the cell 3. Since the cells 1 to 3 managed by the eNB1 are contained in the cell list and the eNB1 is the eNB for managing the cell 3 indicated by the source cell indication, the eNB1 may broadcast the V2X message. Thereafter, the eNB1 may transmit the MBMS session start response message or the MBMS session update response message to the MCE.

In the embodiment of FIG. 8, the eNB2 may check the cell list including the cells 1 to 9 and the source cell indication indicating the cell 3. Since the cells 4 to 6 managed by the eNB2 are contained in the cell list and the eNB2 is the eNB for managing the cell 3 indicated by the source cell indication, the eNB2 may broadcast the V2X message. Thereafter, the eNB2 may transmit the MBMS session start response message or the MBMS session update response message to the MCE.

In the embodiment of FIG. 8, the eNB3 may check the cell list including the cells 1 to 9 and the source cell indication indicating the cell 3. Since the cells 7 to 9 managed by the eNB3 are contained in the cell list but the eNB3 is not the eNB for managing the cell 3 indicated by the source cell indication and the eNB3 is not the eNB having the cell 3 indicated by the source cell indication as the neighbor cell, the eNB3 may not broadcast the V2X message. Thereafter, the eNB3 may reject or ignore the MBMS session start response message or the MBMS session update response message.

Figure 10A:
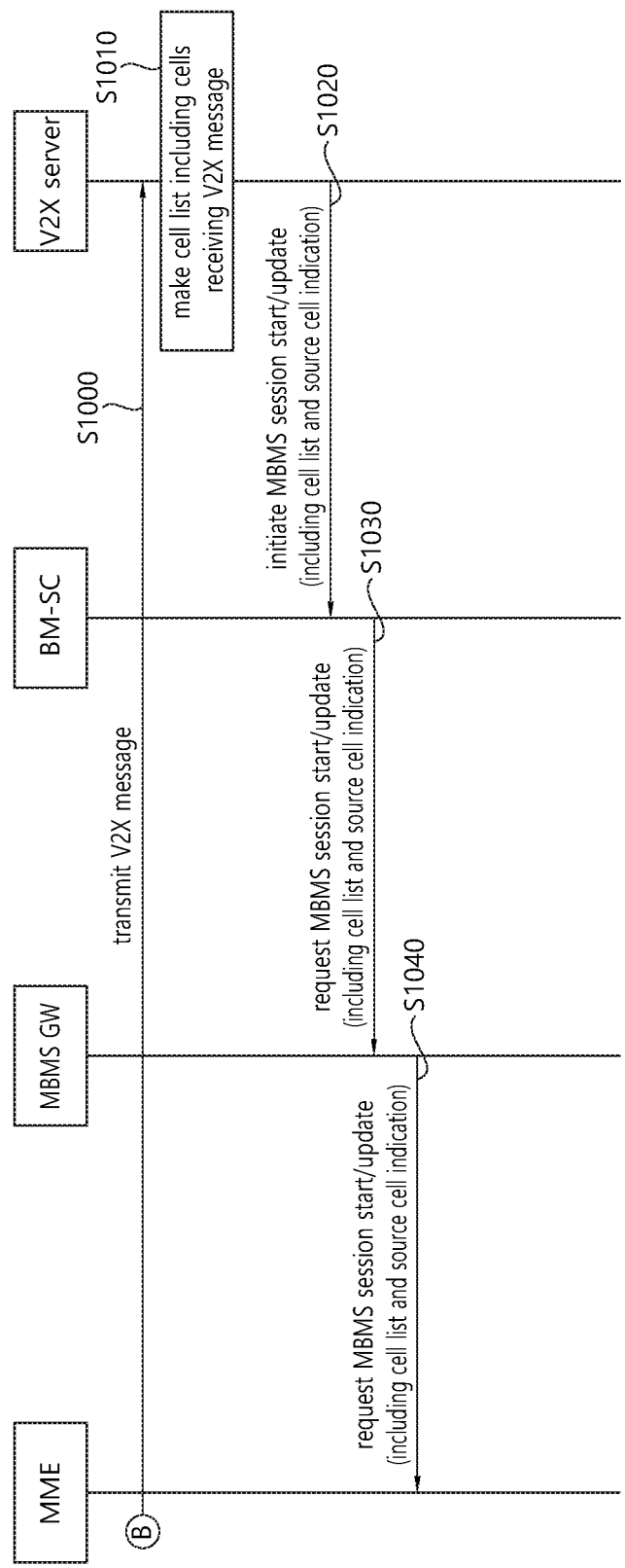
FIG. 10A and FIG. 10B show a procedure of controlling a session for transmitting a V2X message when an MCE filters the distribution of a session control message according to an embodiment of the present invention.
Figure 10B:
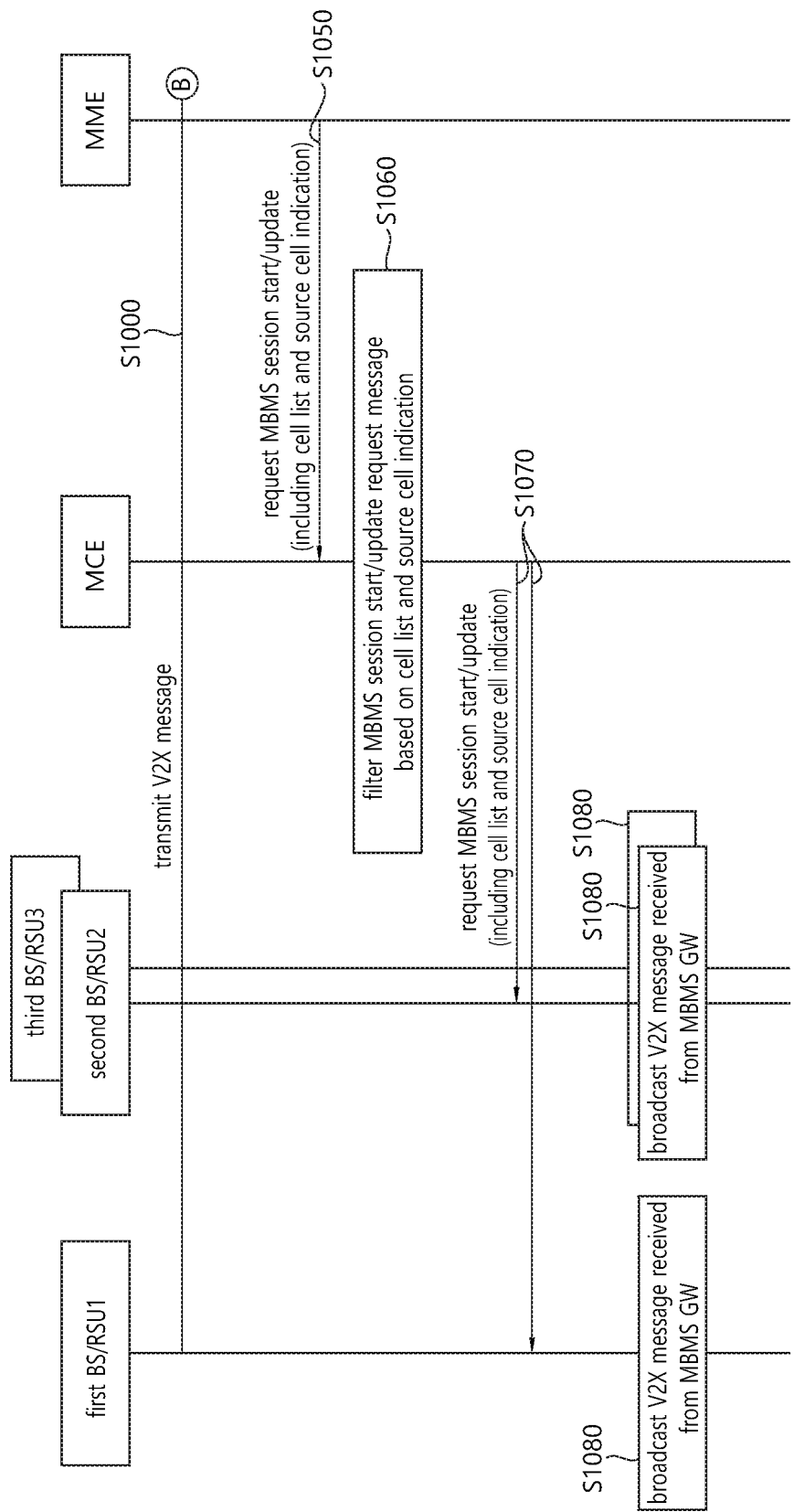

FIG. 10A and FIG. 10B show a procedure of controlling a session for transmitting a V2X message when an MCE filters the distribution of a session control message according to an embodiment of the present invention.

Referring to FIG. 10A, in step S1000, an eNB1 may transmit to a V2X server a V2X message received from a vehicle within the coverage of the eNB1. The V2X message may contain information on an accident event. The V2X server may obtain a cell ID through the V2X message. Alternatively, the V2X server may obtain the cell ID through reporting by the vehicle. In the embodiment of FIG. 8, the eNB1 may transmit to the V2X server a V2X message received from a vehicle within the coverage of a cell 3. The V2X server may obtain a cell ID of the cell 3 through the V2X message or reporting by the vehicle.

In step S1010, the V2X server may make a list of cells which need to transmit the V2X message. The cell list may include a cell which transmits the V2X message. In the embodiment of FIG. 8, the list of cells which need to transmit the V2X message may include cells 1 to 9. The list of cells which need transmit the V2X message may include a cell (i.e., the cell 3) which transmits the V2X message.

In step S1020, the V2X may transmit to a BM-SC an MBMS session start initiate message, an MBMS session update initiate message, an existing message, a new IE included in the existing message, or a new IE included in the new message. The message may include a cell list and a source cell indication. The source cell indication may indicate information related to the cell which transmits the V2X message. When each cell transmits the V2X message, the source cell indication may be an indication for each of the cells within a cell list for indicating each of the cells. Alternatively, the source cell indication may be an ID of the cell which transmits the V2X message. In the embodiment of FIG. 8, the cell list may include the cells 1 to 9. The source cell indication may be an indication for the cell 3. Alternatively, the source cell indication may be an ID of the cell 3.

In step S1030, upon receipt of the MBMS session start initiate message from the V2X server, the BM-SC may transmit an MBMS session start/update request message to an MBMS GW. The MBMS session start request message may include a cell list and a source cell indication. Alternatively, upon receipt of the MBMS session update initiate message from the V2X server, the BM-SC may transmit an MBMS session update request message to the MBMS GW. The MBMS session update request message may include the cell list and the source cell indication.

In step S1040, the MBMS GW may transmit the MBMS session start request message to an MME. The MBMS session start request message may include the cell list and the source cell indication. Alternatively, the MBMS may transmit the MBMS session update request message to the MME. The MBMS session update request message may include the cell list and the source cell indication.

Referring to FIG. 10B, in step S1050, the MME may transmit the MBMS session start request message to an MCE. The MBMS session start request message may include the cell list and the source cell indication. Alternatively, the MME may transmit the MBMS session update request message to the MCE. The MBMS session update request message may include the cell list and the source cell indication.

In step S1060, upon receipt of the MBMS session start request message from the MME, the MCE may filter the distribution of the MBMS session start request message on the basis of the cell list and the source cell indication. Alternatively, upon receipt of the MBMS session update request message from the MME, the MCE may filter the distribution of the MBMS session update request message on the basis of the cell list and the source cell indication. Unlike in the embodiment of FIG. 9B, the MCE may filter the MBMS session start request message or MBMS session update request message, which is received from the MME, and transmit it to the eNB for managing the cell indicated by the source cell indication.

In step S1070, if a specific eNB is the eNB for managing the cell indicated by the source cell indication, the MCE may transmit the MBMS session start request message or the MBMS session update request message to the specific eNB. Alternatively, if the specific eNB is the eNB having the cell indicated by the source cell indication as the neighbor cell, the MCE may transmit the MBMS session start request message or the MBMS session update request message to the specific eNB. The MBMS session start request message or the MBMS session update request message may include a cell list consisting of cells controlled by the specific eNB. If the specific eNB is not the eNB for managing the cell indicated by the source cell identification and the specific eNB is not the eNB having the cell indicated by the source cell indication as the neighbor cell, the MCE may not transmit any message to the specific eNB.

In the embodiment of FIG. 8, since the eNB1 is the eNB for managing the cell 3 indicated by the source cell indication, the MCE may transmit the MBMS session start request message or the MBMS session update request message to the eNB1. The MBMS session start request message or the MBMS session update request message may include the cell list including the cells 1 to 3 and the source cell indication indicating the cell 3.

In the embodiment of FIG. 8, since the eNB2 is the eNB having the cell 3 indicated by the source cell indication as the neighbor cell, the MCE may transmit the MBMS session start request message or the MBMS session update request message to the eNB2. The MBMS session start request message or the MBMS session update request message may include the cell list including the cells 4 to 6 and the source cell indication indicating the cell 3.

In the embodiment 8, since the eNB3 is not the eNB for managing the cell 3 indicated by the source cell indication and the eNB3 is not the eNB having the cell 3 indicated by the source cell indication as the neighbor cell, the MCE may not transmit any message to the eNB3.

In step S1080, if the eNB receives the MBMS session start request message or the MBMS session update request message, the eNB may broadcast the V2X message. The eNB may broadcast the V2X message only in a cell within the cell list. Alternatively, the eNB may broadcast the V2X message in all cells controlled by the eNB. In addition, the eNB may transmit an MBMS session start response message to the MCE in response to the MBMS session start request message. Alternatively, the eNB may transmit an MBMS session update response message to the MCE in response to the MBMS session update request message.

In the embodiment of FIG. 8, the eNB1 and the eNB2 which have received the MBMS session start request message or the MBMS session update request message may broadcast the V2X message. On the other hand, the eNB3 which has not received the MBMS session start request message and the MBMS session update request message may not broadcast the V2X message.

According to the first method proposed in FIG. 9A to FIG. 10B, the V2X message may be broadcast only in a neighbor eNB.

<Second Method>

The second method is based on an MBMS operation. A V2X server may indicate an ID of a cell, which transmits a V2X message, to an MCE. An MBMS service area identity (SAI) may have a value 0. Accordingly, an area where the V2X message needs to be broadcast can be limited.

Figure 11A:
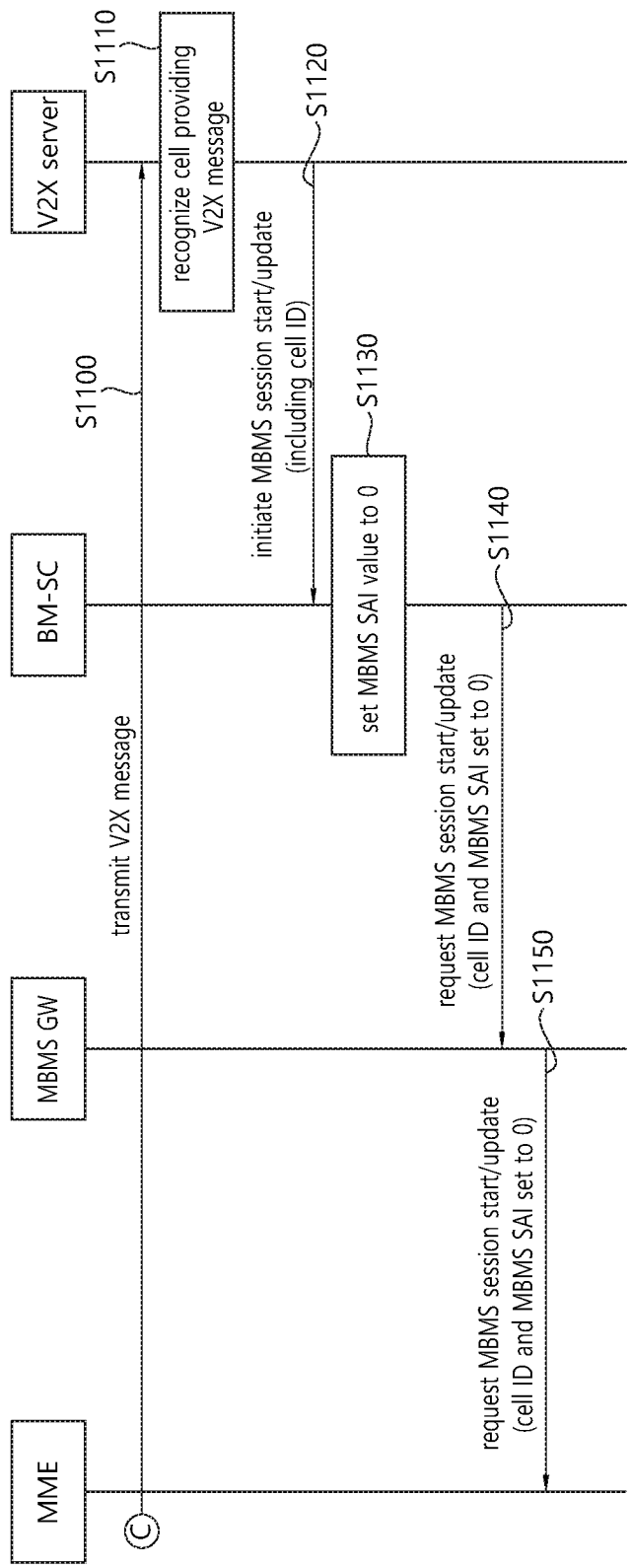
FIG. 11A and FIG. 11B show a procedure of controlling a session for transmitting a V2X message according to an embodiment of the present invention.
Figure 11B:
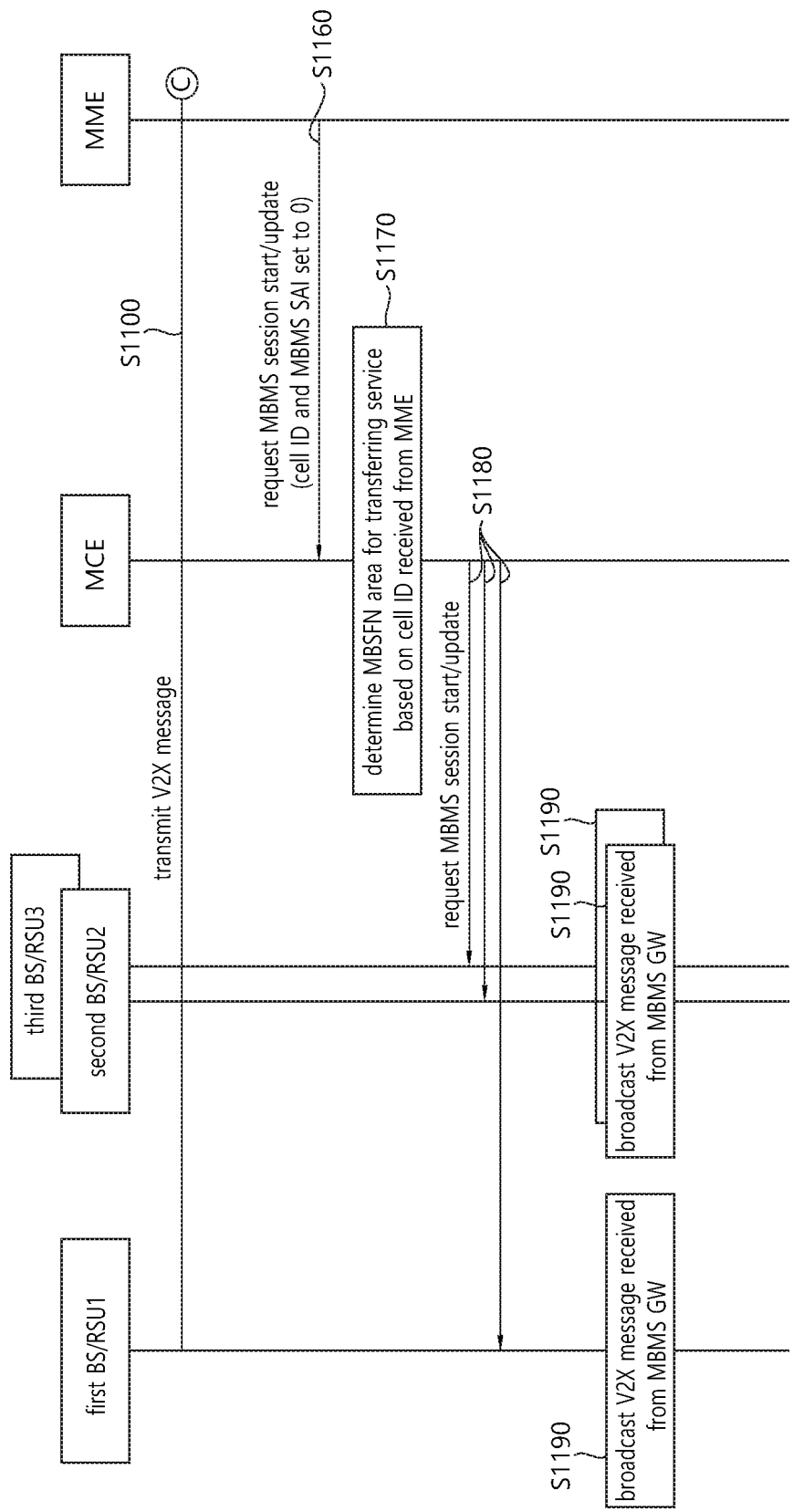

FIG. 11A and FIG. 11B show a procedure of controlling a session for transmitting a V2X message according to an embodiment of the present invention.

Referring to FIG. 11A, in step S1100, an eNB1 may transmit to a V2X server a V2X message received from a vehicle within the coverage of the eNB1. The V2X message may contain information on an accident event. The V2X server may obtain a cell ID through the V2X message. Alternatively, the V2X server may obtain the cell ID through reporting by the vehicle.

In step S1110, the V2X server may recognize the cell which transmits the V2X message.

In step S1120, the V2X may transmit to a BM-SC an MBMS session start initiate message, an MBMS session update initiate message, an existing message, a new IE included in the existing message, or a new IE included in the new message. The message may include the cell ID of the cell for transmitting the V2X message.

In step S1130, upon receipt of the message from the V2X server, if the message includes the cell ID indicating the cell for transmitting the V2X message, the BM-SC may set an MBMS SAI value to 0.

In step S1140, the BM-SC may transmit an MBMS session start request message or an MBMS session update request message to an MBMS GW. The MBMS session start request message or the MBMS session update request message may include a cell ID received from the V2X server and the MBMS SAI with the value 0.

In step S1150, the MBMS GW may transmit the MBMS session start request message or the MBMS session update request message to an MME. The MBMS session start request message or the MBMS session update request message may include a cell ID received from the BM-SC and the MBMS SAI with the value 0.

Referring to FIG. 11B, in step S1160, the MME may transmit the MBMS session start request message or the MBMS session update request message to the MCE. The MBMS session start request message or the MBMS session update request message may include the cell ID received from the MBMS GW and the MBMS SAI with a value 0.

In step S1170, if the MCE receives the MBMS session start request message or the MBMS session update request message from the MME, the MCE may determine an MBSFN area where a service should be transferred based on the cell ID received from the MME. This is because the MBMS SAI has a value 0. This operation may reduce a size of the MBSFN area where the V2X message needs to be transferred.

In step S1180, the MCE may transmit the MBMS session start request message or the MBMS session update request message to the eNB. The eNB may be an eNB belonging to a newly determined MBSFN area.

In step S1190, upon receipt of the MBMS session start request message or the MBMS session update request message, the eNB may broadcast the V2X message received from the MBMS GW.

According to the second method proposed in FIG. 11A and FIG. 11B, the area where the V2X message is transferred may be decreased.

Figure 12:
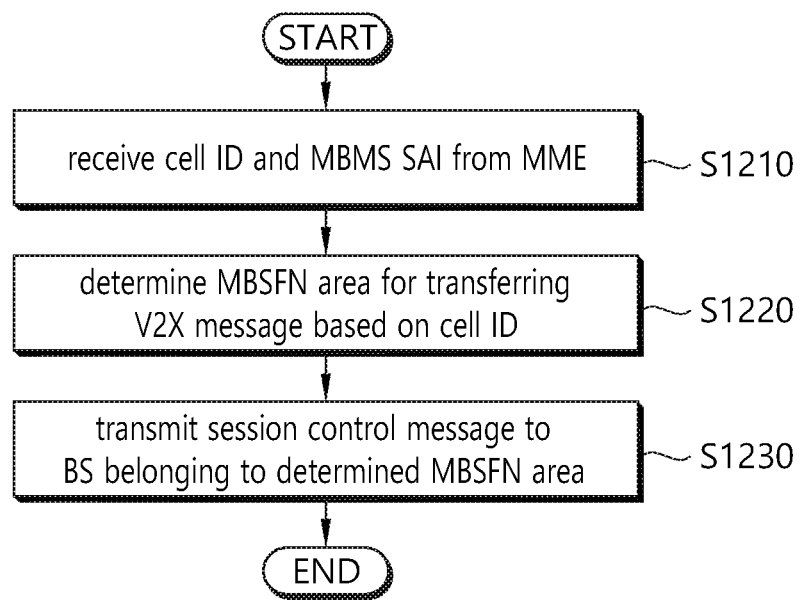
FIG. 12 is a block diagram showing a method in which an MCE controls a session for transmitting a V2X message according to an embodiment of the present invention.

FIG. 12 is a block diagram showing a method in which an MCE controls a session for transmitting a V2X message according to an embodiment of the present invention.

Referring to FIG. 12, in step S1210, the MCE may receive a cell ID and a multimedia broadcast multicast service (MBMS) service area identity (SAI) from a mobility management entity (MME). The cell ID may be an ID of a cell in which the V2X message is transmitted. The MBMS SAI may be set to 0.

In step S1220, the MCE may determine a multicast broadcast single frequency network (MBSFN) area where the V2X message is to be transferred based on the cell ID.

In step S1230, the MCE may transmit a session control message to an eNB belonging to the determined MBSFN area. The session control message may be an MBMS session start request message. The cell ID and the MBMS SAI may be included in an MBMS session start request message transmitted by the MME. The session control message may be an MBMS session update request message. The cell ID and the MBMS SAI may be included in the MBMS session update request message transmitted by the MME. The eNB may be a road side unit (RSU).

Figure 13:
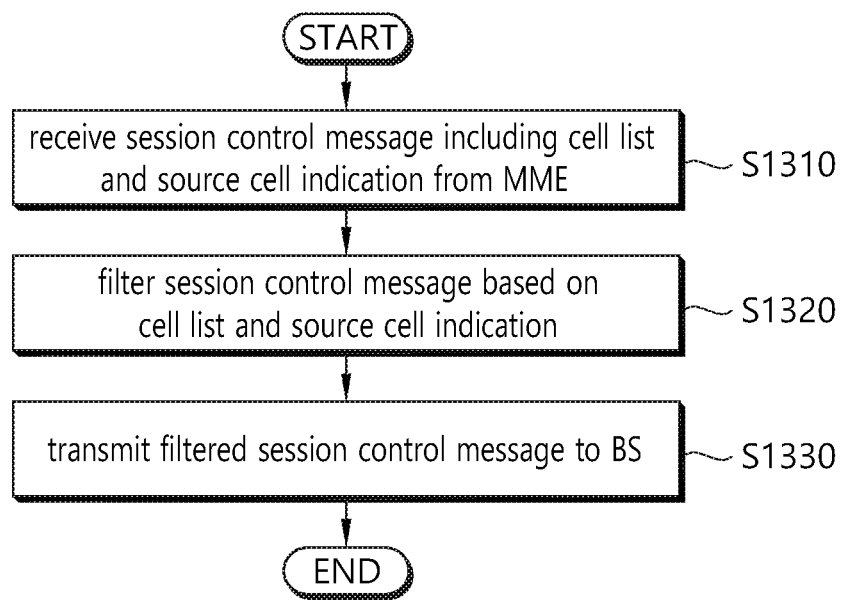
FIG. 13 is a block diagram showing a method in which an MCE controls a session for transmitting a V2X message according to an embodiment of the present invention.

FIG. 13 is a block diagram showing a method in which an MCE controls a session for transmitting a V2X message according to an embodiment of the present invention.

Referring to FIG. 13, in step S1310, the MCE may receive from a mobility management entity (MME) a session control message including a cell list and a source cell indication. The source cell indication may indicate a cell in which the V2X message is transmitted. The session control message may be one of an MBMS session start request message and an MBMS session update request message.

In step S1320, the MCE may filter the session control message on the basis of the cell list and the source cell indicator.

In step S1330, the MCE may transmit the filtered session control message to the eNB.

The filtered session control message may include a list of cells managed by the eNB. The eNB may be an eNB for managing a cell indicated by the source cell indication. Alternatively, the eNB may be an eNB for managing a neighbor cell of the cell indicated by the source cell indication. The eNB may be a road side unit (RSU).

Figure 14:
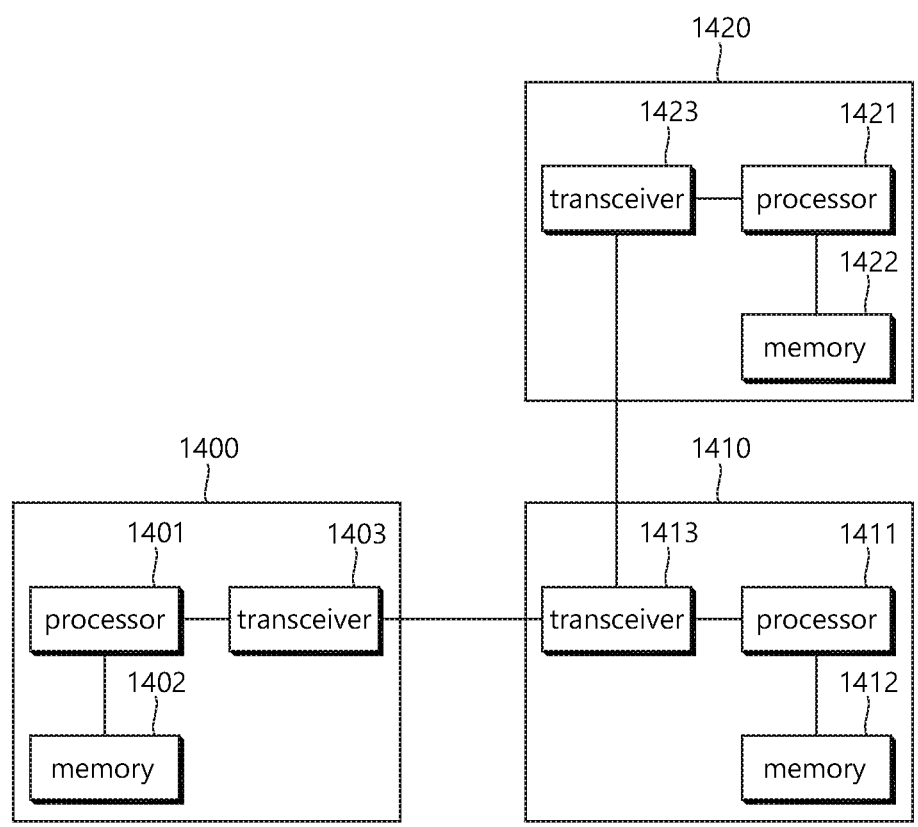
FIG. 14 is a block diagram illustrating a wireless communication system according to the embodiment of the present invention.

FIG. 14 is a block diagram illustrating a wireless communication system according to the embodiment of the present invention.

A BS 1400 includes a processor 1401, a memory 1402, and a transceiver 1403. The memory 1402 is connected to the processor 1401, and stores various information for driving the processor 1401. The transceiver 1403 is connected to the processor 1401, and transmits and/or receives radio signals. The processor 1401 implements proposed functions, processes and/or methods. In the above embodiment, an operation of the BS may be implemented by the processor 1401.

An MCE 1410 includes a processor 1411, a memory 1412, and a transceiver 1413. The memory 1412 is connected to the processor 1411, and stores various information for driving the processor 1411. The transceiver 1413 is connected to the processor 1411, and transmits and/or receives radio signals. The processor 1411 implements proposed functions, processes and/or methods. In the above embodiment, an operation of the MCE may be implemented by the processor 1411.

An MME 1420 includes a processor 1421, a memory 1422, and a transceiver 1423. The memory 1422 is connected to the processor 1421, and stores various information for driving the processor 1421. The transceiver 1423 is connected to the processor 1421, and transmits and/or receives radio signals. The processor 1421 implements proposed functions, processes and/or methods. In the above embodiment, an operation of the MME may be implemented by the processor 1421.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of controlling a session for transmitting a vehicle to everything (V2X) message by a multi-cell coordination entity (MCE) in a wireless communication system, the method comprising:
    receiving a cell identifier (ID) and a multimedia broadcast multicast service (MBMS) service area identity (SAI) from a mobility management entity (MME),
    wherein the cell ID is an ID of a cell in which the V2X message is transmitted, and
    wherein the MBMS SAI is set to zero by a broadcast multicast service center (BM-SC), based on the BM-SC receiving the cell ID;
    based on the cell ID, determining a multicast broadcast single frequency network (MBSFN) area where the V2X message is to be transferred; and
    transmitting a session control message to a base station which belongs to the determined MBSFN area.

2. The method of claim 1, wherein the base station is a road side unit (RSU).

3. The method of claim 1, wherein the session control message is an MBMS session start request message.

4. The method of claim 1, wherein the cell ID and the MBMS SAI are received being included in a MBMS session start request message transmitted by the MME.

5. The method of claim 1, wherein the session control message is an MBMS session update request message.

6. The method of claim 1, wherein the cell ID and the MBMS SAI are received being included in a MBMS session update request message transmitted by the MME.

7. A method of controlling a session for transmitting a vehicle to everything (V2X) message by a multi-cell coordination entity (MCE) in a wireless communication system, the method comprising:
    receiving a session control message comprising a cell list and a source cell information from a mobility management entity (MME),
    wherein the cell list comprises cells to which the V2X message is to be transmitted, and
    wherein the source cell information represents a cell in which the V2X message is transmitted;
    filtering the distribution of the session control message based on the cell list and the source cell information; and
    transmitting the session control message to a base station, wherein the base station is to receive the session control message based on the filtering.

8. The method of claim 7, wherein the base station is a road side unit (RSU).

9. The method of claim 7, wherein the session control message comprises a list of cells managed by the base station.

10. The method of claim 7, wherein the base station is a base station which manages a cell informed by the source cell information.

11. The method of claim 7, wherein the base station is a base station which manages a neighbor cell of a cell informed by the source cell information.

12. The method of claim 7, wherein the session control message is any one of an MBMS session start request message and an MBMS session update request message.

13. A multi-cell coordination entity (MCE) for controlling a session for transmitting a vehicle to everything (V2X) message in a wireless communication system, the MCE comprising:
- a memory; a transceiver; and a processor for coupling the memory and the transceiver, wherein the processor is configured to:
- control the transceiver to receive a cell identifier (ID) and a multimedia broadcast multicast service (MBMS) service area identity (SAI) from a mobility management entity (MME),
- wherein the cell ID is an ID of a cell in which the V2X message is transmitted, and
- wherein the MBMS SAI is set to zero by a broadcast multicast service center (BM-SC), based on the BM-SC receiving the cell ID;
- based on the cell ID, determine a multicast broadcast single frequency network (MBSFN) area where the V2X message is to be transferred; and
- control the transceiver to transmit a session control message to a base station which belongs to the determined MBSFN area.

\* \* \* \* \*